(No Model.)
2 Sheets—Sheet 1.
E. TOURANGIN.
PROCESS OF AND APPARATUS FOR THE REDUCTION OF IRON ORE.
No. 268,840.
Patented Dec. 12, 1882.
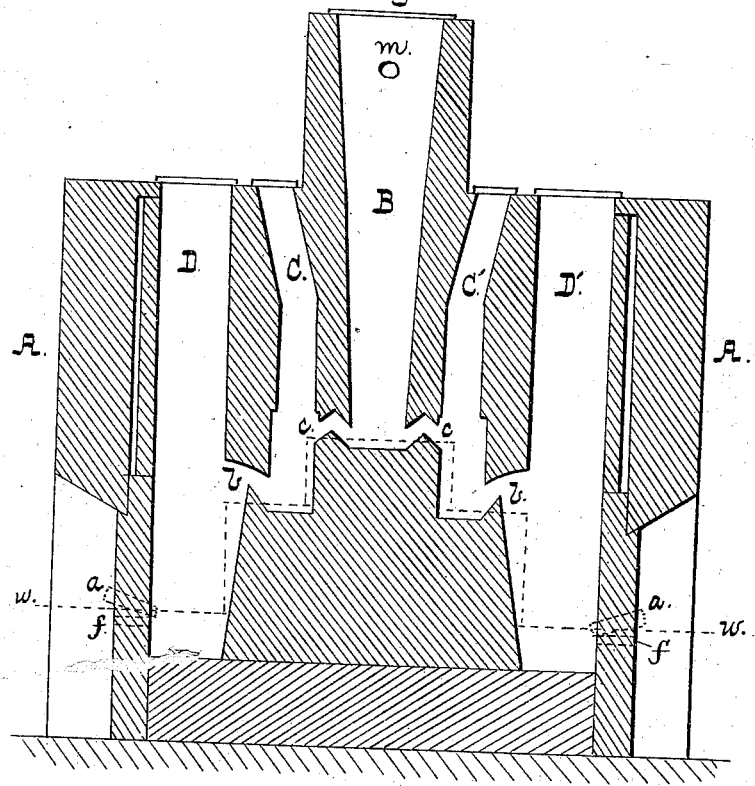
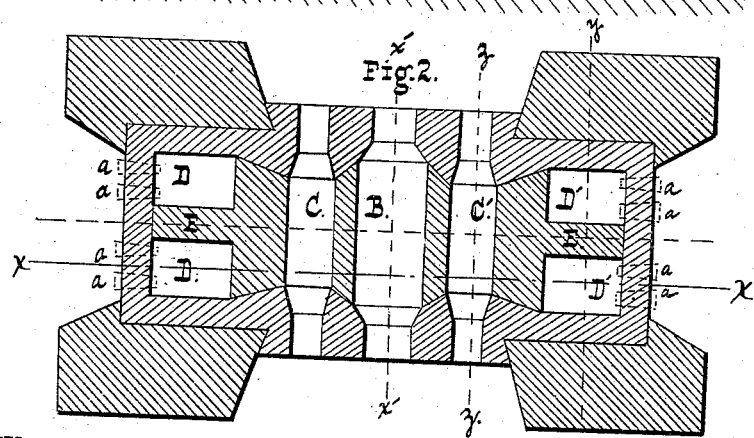

(No Model.) 2 Sheets—Sheet 2.

E. TOURANGIN.
PROCESS OF AND APPARATUS FOR THE REDUCTION OF IRON ORE.

No. 268,840. Patented Dec. 12, 1882.

UNITED STATES PATENT OFFICE.

ERNEST TOURANGIN, OF SALBRIS, FRANCE, ASSIGNOR TO LOUIS DURAND AND DEXTER H. WALKER, BOTH OF NEW YORK, N. Y.

PROCESS OF AND APPARATUS FOR THE REDUCTION OF IRON ORE.

SPECIFICATION forming part of Letters Patent No. 268,840, dated December 12, 1882.

Application filed November 1, 1881. (No model.)

*To all whom it may concern:*

Be it known that I, ERNEST TOURANGIN, of Salbris, Loir-et-Cher, Republic of France, have invented certain new and useful Improvements in Processes of and Apparatus for the Reduction of Iron Ore; and I hereby declare the same to be fully, clearly, and exactly described as follows, reference being had to the accompanying drawings, in which—

Figure 4:
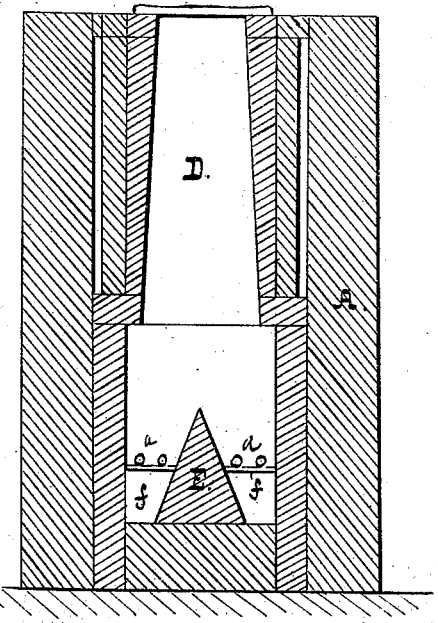
Figure 5:
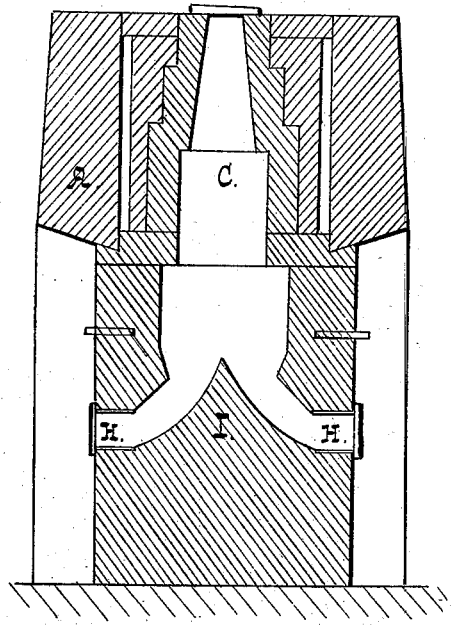
Figure 3:
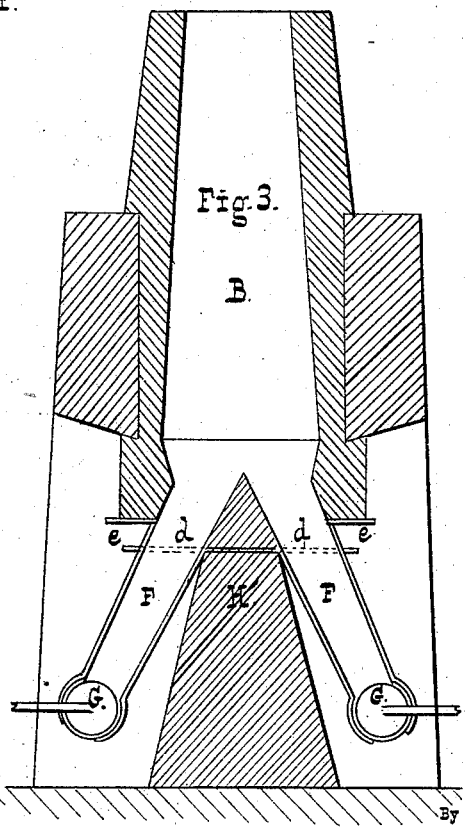

Figure 1 is a central vertical longitudinal sectional view of the furnace on the line $x\ x$ of Fig. 2. Fig. 2 is a horizontal sectional view on the line $w\ w$ of Fig. 1. Fig. 3 is a vertical sectional view on the line $x'\ x'$ of Fig 2. Fig. 4 is a similar view on the line $y\ y$ of Fig. 2, and Fig. 5 is a similar view on the line $z\ z$ of Fig. 2.

My invention relates to the reduction of iron ores to the state of pulverulent metal or sponge; and it consists, first, in a method of reducing the ore to the metallic state by means of gaseous reducing agents exclusively; second, in the production of steel direct from the ore, as incident to the reduction of the ore to the state of sponge-iron, either or both of the said processes being effected by the use of either vegetable or mineral fuel; third, in the latter case, the method of freeing the reducing-gases from the presence of constituents which would otherwise injure the product; and, fourth, in the apparatus used, all substantially as hereinafter set forth.

The reduction of the oxides of iron to the state of pulverulent metal or sponge—whether by the laboratory processes of reduction through the action of hydrogen or hydrocarbon gases upon the oxide, or on a commercial scale by the action of solid carbon upon the ore—has long been known and to some extent practiced, and various processes for the production of sponge-iron are described in the books and have been made the subject of Letters Patent in England, France, and the United States. While such reduction is theoretically feasible on a large scale, it has heretofore not been practically and commercially successful, and the failure has been due to two principal causes—viz., structural defects in the apparatus and the use of other than the proper reducing agent, or rather, the use of the proper reducing agent, if at all, unwittingly and under such conditions as to prevent the attainment of any useful end whatever. The agent to which I have reference—carbonic oxide (CO)—while being a product of the incomplete combustion of carbonaceous matter or of the action of carbonic acid ($CO_2$,)—the product of complete combustion)—upon carbon, is necessarily produced in greater or less proportion, and is perhaps to that extent active, in all or nearly all the well-known processes for the reduction of iron ore to sponge; but, as above stated, the results which would have attended its use under proper conditions, which is the pith of my invention, were either defeated entirely or were so masked by the admixture of solid carbon with the ore, or by the maintenance of improper temperatures in the apparatus, that no good results have been heretofore known as attending the presence of this gas, nor has its adaptability for the purpose been recognized or admitted.

The defects in processes heretofore proposed or attempted for the reduction of ore by means of carbonic oxide have been due to the fact that either the ore or gas, or both, were heated independently of the heating attending the production of the gas, causing the sponge to agglomerate, or else the ore was mixed with carbonaceous matter.

In my process the ore is unheated, except by the gaseous reducing agent, and it (CO) has only its natural temperature—*i. e.*, the temperature incident upon its production.

I have devised an apparatus in which this gas is produced in a state of purity—that is, in the sense of its freedom from admixture with any agent which could have a deleterious effect upon its action—and which said apparatus is adapted as well for the production of the carbonic oxide from vegetable as from mineral fuel, and in the latter case means are afforded for eliminating impurities—such as sulphur—from the gas. The apparatus is adapted also for the conversion of the metallic sponge into steel.

Proceeding now to a description of the invention, and referring to the accompanying drawings, A is the furnace, constructed exteriorly of any suitable masonry—such as brickwork—and having its interior lined with fire-brick. It consists, by preference, of five vertical chambers, B C C′ D D′, the chambers C′ D′ being counterparts respectively of the chambers C D. Suitable tuyeres, $a\,a$, enter the chambers D D, near their bases, each chamber having preferably four tuyeres. The chambers D D′ communicate with the chambers C C′ by means of channels $b\,b$, and the chambers C C′ have openings $c\,c$ leading to the central shaft or chamber, B, near its base.

The accompanying drawings are made to scale fifteen millimeters to the meter, the scale below Fig. 2 being assumed to truly represent a decimeter and its divisions, and the apparatus is of a capacity to reduce ten tons of ore per diem.

The various chambers are provided with suitable apparatus for closing them at the top, which I have considered it unnecessary to illustrate and shall not particularly describe, as such apparatus is old and well known. Suffice it that it is only desirable that the closing device be of such construction as to avoid loss of gas from the chambers while charging them. The chambers D D′ constitute the gas-generators, and each is provided at its base with a wedge-shaped partition, E, extending entirely across the generator parallel to the plane of the tuyeres, and has its apex or ridge one meter above the bottom of the chamber or crucible. This separation into two compartments at the bases of the generators is important as facilitating the discharge of refuse.

In Fig. 3 is shown a section of the central or reducing chamber, B, on the line $x'\,x'$ of Fig. 2. Into this chamber the ore is charged, and at the bottom of the chamber are two tubes, F, into which the sponge descends, and which discharge at the sides of the furnace. These tubes are by preference made double, and a current of water is caused to flow between the walls in order to cool the contents of the tubes and prevent spontaneous combustion of the sponge when removed therefrom. G G are rotary taps, whereby the metal may be removed without permitting escape of gas from the stack. H′ is a wedge-shaped block of masonry covered with fire-brick, and arranged to discharge the sponge into the tubes F, and serve as a support for the cast-iron plate $d$, which supports them. Cast-iron plates $e\,e$ are built into the walls and sustain the overhanging portion.

In Fig. 4 is shown a vertical section of the generators on the line $y\,y$ of Fig. 2. Here $a\,a$ are the tuyeres, and $f\,f$ the cast-iron plates on which they rest. The space below these plates is, in operation, filled with cinders, and E is the wedge-shaped masonry structure which separates the base of the generator into two compartments. The lower portions of the generators are made larger than the upper, the design being to prevent the fuel from settling down.

In Fig. 5 is shown the chamber C (C′) in section on the line $z\,z$ of Fig. 2. These chambers increase in size from above downward, and at the bottom are wedge-shaped walls I, leading to lateral openings H, which latter are provided with doors that are luted air-tight in operation.

The apparatus is designed, first, for the reduction of the ore to sponge-iron, vegetable fuel alone being used for the production of the reducing agents—carbonic oxide and hydrogen; second, for the reduction of the ore as above, mineral fuel being used, and means being provided for the elimination from the gases of all traces of sulphur, whereby an iron is made equal in quality to that reduced by vegetable fuel; third, for the reduction by vegetable fuel, with either a total or partial conversion of the product into steel; and, fourth, for producing steel from the ore, coal or coke being used as fuel.

I shall describe the *modus operandi* in each of the before-mentioned cases.

A. *Reduction of the ore by the use of vegetable fuel.*—The ore is charged into the compartment B, completely filling it, and the chambers C C′ D D′ are filled with charcoal, the top openings of all being hermetically sealed. The surplus gases from the compartment B are led away through a pipe or pipes opening into it near its top, as at $m$, to the hearth, where they are burned to heat the blast. The various compartments are charged from time to time, the intervals never being allowed to exceed three hours. The air for supporting combustion is directed into the bases of the generators D D′ through the tuyeres $a$, and the product of the complete combustion at that point is carbonic acid, ($CO_2$,) the temperature being theoretically about 2,200° centigrade. The carbonic acid generated is compelled to traverse the whole layer of charcoal between the level of the tuyeres $a$ and the orifices $b$, pending which transit it is gradually converted into carbonic oxide (CO) by contact with the charcoal. The heat, which becomes latent in this conversion, theoretically lowers the temperature to 780° centigrade; but practically this reduction is enhanced by radiation and absorption to about from 620° to 650° centigrade. Complete conversion of the $CO_2$ into CO is essential to the proper working of the apparatus, and in order to insure it the layer of charcoal which the gases are compelled to traverse must be ample. There exists no theoretical principle for determining *a priori* the requisite volume of this layer; but practical experience has shown that about ten hectoliters per ton of charcoal consumed per diem is sufficient. As the consumption by the furnace, under the conditions upon which this assertion is based, is four thousand kilos for the reduction of ten tons of ore, the total volume of the layer to be traversed by the gas must be forty hectoliters, or twenty hectoliters for each generator. This volume may well be increased without any possible deleterious result, and in practice it is better to adopt, say, twenty-two to twenty-four hectoliters instead of twenty, foreseeing a case in which the fuel is of exceptional density, or in which it is desired to somewhat increase the daily production. The dimensions in each generator shown in the drawings are as follows: length perpendicular to the tuyeres, 1.72 meter; width opposite the tuyeres and at their level, 0.94 meter; height, 1.50 meter; whence we find the contents to be about 2.425 cubic meters, or 24.5 hectoliters for each generator, which is ample for the complete conversion of the carbonic acid into carbonic oxide in cases of the consumption of four or even five tons of charcoal per diem. The gaseous mass as it issues through the openings $b$ consists of carbonic oxide, nitrogen, and steam, the latter having been derived from the hygrometric water of the charcoal, and in this state it enters the chambers C C′, where it encounters a new layer of charcoal between the levels of the openings $b$ and $c$. In this transit the carbonic oxide and nitrogen remain unaltered, because charcoal at a red heat has no action upon either gas; but the steam decomposes by the action of the carbon upon its oxygen, the resultant products being carbonic oxide and free hydrogen. Inasmuch as the volume of watery vapor is small in comparison with that of gas, the area of the chambers C C′ between the levels $b$ and $c$ necessary for the complete conversion of the vapor into carbonic oxide and hydrogen need not exceed a tenth of that of the generators, or, say, from two to 2.5 hectoliters for each compartment; but, as in the other case, excess does no harm, and I deem it proper to largely increase the necessary area in order to provide for other operations, as hereinafter set forth. The dimensions given in the drawings are: length perpendicular to section of Fig. 1, 1.72 meter; width parallel to section of Fig. 1, 0.58 meter; height 0.90 meter—that is to say, the cubical contents are about 0.897 cubic meter = nine hectoliters for each compartment. This great excess is never harmful, and is in some instances useful to the extent of being absolutely necessary, as will hereinafter appear. The gases which enter the base of the chamber B are composed only of carbonic oxide, hydrogen, and nitrogen. The first two are energetically reductive and the latter absolutely inert. As the gaseous mass passes upward through the chamber B it yields up to the latter a portion of its heat until an equilibrium of temperature is established, when the carbonic oxide and hydrogen take gradual possession of the oxygen of the ore, reducing the latter to the state of metallic sponge.

The capacity of the compartment B must be proportionate to the quantity of ore which it is desired to reduce every twenty-four hours, and which in the present case is ten tons. Reduction is not immediately effected by any means. The ore must remain for a certain length of time exposed to the action of the reductive gases in order to pass to the state of sponge. We know that in the blast-furnace the conversion is effected in sixteen hours, and about the same time is required in my apparatus. The reduction of ten tons in twenty-four hours corresponds to 416.66 kilos per hour, and for sixteen hours the amount would be six thousand six hundred and sixty-six kilos. Therefore the volume of the chamber must be about four cubic meters. The average dimensions of the chamber are: length perpendicular to section of Fig. 1, 1.46 meter; width parallel to section of Fig. 1, 0.86 meter; height above entrance of gases, five meters; whence we find the contents to be about six cubic meters, from which about one-fourth must be deducted, because the gases are taken from the compartment 1.20 meter below the superior level, and exert no influence upon the ore above that point. The residual excess—0.50 cubic meter—is not injurious and in some cases beneficial. To obtain perfectly regular metallic sponge it is sufficient to regulate the introduction of air through the tuyeres in such manner as to burn four thousand kilos of charcoal per diem, or one hundred and sixteen kilos per hour, and at the same time to extract a volume of metallic sponge equal to that of four hundred and seventeen kilos of ore, gross weight, or, say, 2.5 hectoliters. The best device for the removal of the sponge is the rotary tap G, which operates on the principle of an ordinary spigot, and at each complete revolution it discharges the sponge which fills it. This amount, since there are two taps, should be from 1.25 to 1.5 hectoliters. It is essential that the sponge shall reach the taps cold, else spontaneous ignition is liable to occur; and, furthermore, it is desirable as insuring a free working of the taps. This cooling may be effected by causing a current of water to circulate between the walls of the tubes F. The latter, according to the dimensions shown, contain each thirteen hundred kilos of sponge, or in all twenty-six hundred kilos. The duration of the sojourn of the sponge in the tubes may be calculated from the proportion $10,000 : 24 :: 2,600 : x$, whence we find the time to be about six and one-fourth hours. This is ample for the cooling of the sponge, even without the water-jacket.

B. *Reduction of the ore, mineral fuel being used.*—The material and important difference between coal or coke and charcoal for the reduction of iron ores consists in the presence of sulphur in the former, while the vegetable carbon contains none. This sulphur, if left in the gases used for reduction of the ore, would result in the production of an iron which would be practically worthless, since as little as one ten-thousandth part of sulphur is enough to make the iron brittle, and a larger proportion renders it entirely unserviceable. It is therefore essential to thoroughly eliminate all sulphur from the gases in case mineral fuel is used. If so, the chambers C C′ are filled with a mixture of charcoal and scrap-iron, instead of charcoal alone, as in the preceding case. The conversion of the carbonic acid into carbonic oxide and the decomposition of the hygrometric water are effected precisely as hereinbefore described, and the charcoal mixed with the scrap-iron effects the conversion of the steam into carbonic oxide and hydrogen. It is susceptible of demonstration that the gaseous mass obtained from coke must be compelled to traverse a layer of scrap-iron of a volume of one hectoliter per ton of ore to be reduced per diem, provided the average superficies of the particles of scrap-iron is two square centimeters. The quantity of ore to be reduced being ten tons, the volume of the mass of scrap must be ten hectoliters—i. e., five for each chamber. The capacity of the chambers being nine hectoliters each, there remain four to be filled with charcoal, which is more than sufficient; but the excess does no harm. The above figures are based on the assumption that the coke contains seven kilos of sulphur per ton. Of course an excess demands a corresponding increase in iron scrap. The object of mixing charcoal with the scrap is to reduce any oxide of iron which would be formed by the action upon the scrap of the steam and watery vapors driven off from the fuel in the chambers D. Were it not for the presence of the carbon, the iron would become superficially oxidized, and its efficiency as a desulphurizing agent would be impaired. The mixture of charcoal and iron, which latter is superficially converted into sulphide, is gradually removed from the chambers through the openings H, the charcoal is separated, and the iron is thrown into water, whereby the sulphureted portion is removed and the iron may be reused.

C. *Carburation of the whole or a part of the sponge to make steel, charcoal being used as fuel.*—In this case the reduction of the ore and the decomposition of the steam take place precisely as in the first case. The compartments C C' are filled with a mixture of two parts of carbon and one part of metallic sponge. The charcoal must be absolutely dry, and the duration of its contact with the sponge must be about four hours. This time is, however, only approximate. Practice soon shows the necessary duration, which will depend somewhat upon the nature of the ore. Now, inasmuch as the volume of carbon is double that of the sponge, and in the supposed case there is a yield of six cubic meters of sponge per diem, and the total bulk of material for conversion into steel is eighteen cubic meters—a greater capacity of the chambers C C' than that indicated is necessary; but this is on the supposition that the whole yield of the furnace is to be converted into steel, which will rarely be the case. The proportions shown in the drawings will suffice for the conversion of from one-third to one-half of the total product, which is generally ample.

D. *Carburation of sponge as before, coke being used as fuel.*—In this case a special desulphurizing-chamber similar to C C' must be used, through which the gases are passed before entering the carbureting-chamber. In all other respects the operation is the same as in the last case. The air is first passed through the chambers D D' for the production of carbonic oxide; thence through C C', which are filled with a mass of iron scrap and carbon, whereby the gas is desulphurized; thence through a pair of chambers similar to the last and filled with a mixture of sponge and carbon; and, finally, through the chamber B, which is filled with ore. I have considered it unnecessary to show this construction in the drawings, since it involves a mere duplication of the chambers C C'.

By the described processes an iron or steel, as the case may be, is produced of unexceptionable quality, and the working of the process is very economical, and is susceptible of the nicest regulation.

Having thus described my invention, what I claim as new, and desire to secure by Letters Patent, is—

1. The method herein described of producing sponge-iron from the ore, consisting in passing a current of atmospheric air through incandescent carbonaceous matter, converting the carbonic acid so produced into carbonic oxide by passage through a stratum of carbon sufficient to that end, and finally conducting the carbonic oxide at the temperature incident upon its production through the mass of ore unheated and unmixed with carbonaceous matter, substantially as described.

2. The method herein described of producing sponge-iron from the ore, consisting in passing through the mass of unheated ore unmixed with carbonaceous matter the gases resulting from the action of carbon upon the products of combustion and upon the hygrometric moisture of the fuel, carbonic oxide, and hydrogen—to wit, the said gases having the temperature incident upon their production—substantially as and for the purpose set forth.

3. The method herein described of producing sponge-iron from the ore, consisting in passing the gases produced by injecting a current of air through incandescent mineral fuel, and thence through a stratum of carbon to produce carbonic oxide, through a mass of scrap-iron and carbon, and finally conducting the said gases at the temperature incident upon their production through the body of unheated ore unmixed with carbonaceous matter, as set forth.

4. The method herein described of preparing steel from the ore, consisting in passing through a mixture of unheated sponge-iron and carbon the gases produced by injecting atmospheric air into a mass of incandescent carbon, and passing it thence through a stratum of carbon sufficient to convert the carbonic acid and steam into carbonic oxide and free hydrogen, the said gases having the temperature incident upon their production, substantially as set forth.

5. The method herein described of preparing at once iron and steel from the ore, consisting in passing a current of carbonic-oxide gas, at the temperature incident upon its production, through a mixture of unheated sponge-iron and carbon, and thence through a mass of unheated ore unmixed with carbonaceous matter, substantially as set forth.

6. The method herein described of preparing at once sponge-iron and steel from the ore, consisting in producing a current of reductive gas from mineral fuel, desulphurizing the same by transit through a mass of scrap-iron and carbon, and conducting it thence through a mass of sponge-iron and carbon, and finally through the mass of ore, substantially as set forth.

7. The apparatus herein described, for the purposes set forth, consisting of a gas-generating chamber provided with tuyeres near its base and an opening in its side, leading into the base of a second chamber, from which a lateral opening below the top of the chamber leads into the base of the reducing-stack, whereby a space is left in each chamber above the exit-level of the gases which pass through the series, and the contents of each chamber feed progressively downward to the zone of chemical action.

8. The apparatus herein described for the coincident reduction of ore to the state of sponge and the conversion of sponge into steel, consisting of one or more gas-generating chambers having tuyeres near the base and lateral openings $b$, leading into the base or bases of one or more converting-chambers, C C', the said converting-chambers having lateral openings $c$, leading into the base of the reduction-stack B, each chamber having a central wedge-shaped wall at its base adapted to discharge the contents laterally.

9. In combination with the gas-generating chamber and the chamber C (C',) having lateral openings below their tops, whereby the gases traverse but a portion of each chamber, the reduction-stack B, having a central wedge-shaped wall at its base adapted to discharge the contents of the stack into extended cooling-tubes F, which terminate in air-excluding taps G, as set forth.

In witness that I claim the foregoing I have hereunto set my hand.

ERNEST TOURANGIN.

Witnesses:
ROBT. M. HOOPER,
E. PAGER.